(12) United States Patent
Marutzky

(10) Patent No.: US 12,187,438 B2
(45) Date of Patent: Jan. 7, 2025

(54) TRACK LOCKING SYSTEM FOR AN AIRCRAFT SEAT

(71) Applicant: AMI Industries, Inc., Colorado Springs, CO (US)

(72) Inventor: Kyler J. Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 18/218,437

(22) Filed: Jul. 5, 2023

(65) Prior Publication Data

US 2024/0025550 A1 Jan. 25, 2024

Related U.S. Application Data

(60) Provisional application No. 63/391,998, filed on Jul. 25, 2022.

(51) Int. Cl.
*B64D 11/06* (2006.01)
(52) U.S. Cl.
CPC ............................... *B64D 11/0696* (2013.01)
(58) Field of Classification Search
CPC ............ B64D 11/0696; B64D 11/0648; B60N 2/01525; B60N 2/01575
See application file for complete search history.

(56) References Cited

U.S. PATENT DOCUMENTS

| 2,669,284 A | 2/1954 | Pall et al. |
| 4,062,298 A | 12/1977 | Weik |
| 4,157,797 A | 6/1979 | Fox |
| 4,183,493 A | 1/1980 | Koutsky |
| 4,493,470 A * | 1/1985 | Engel ..................... F16B 21/10 244/118.6 |

(Continued)

FOREIGN PATENT DOCUMENTS

| CA | 2823551 A1 | 2/2014 |
| DE | 10229385 A1 | 1/2003 |

(Continued)

OTHER PUBLICATIONS

Extended European Search Report dated Dec. 4, 2023; European Application No. 23187604.6.

(Continued)

*Primary Examiner* — Amy J. Sterling
(74) *Attorney, Agent, or Firm* — Suiter Swantz IP

(57) ABSTRACT

An aircraft seating system may include an integrated track locking system. The track locking system may include a track lock. The track lock may include a base fitting, securing the seat to the seat track when the seat track feet are between a metered position. The track lock may also include a shaft, a locking hole, and a confinement hole. The track locking system may include a through hole, where the shaft of the track lock is able to fit within the through hole. The track locking system may include a locking cavity. The track locking system may include one or more recesses on at least one face of the locking cavity. The track locking system may include a locking member secured by the one or more recesses and the locking hole. The track locking system may include a confinement member secured by the confinement hole via the through hole.

19 Claims, 18 Drawing Sheets

(56) References Cited

U.S. PATENT DOCUMENTS

| | | |
|---|---|---|
| 5,131,606 A | 7/1992 | Nordstrom |
| 5,785,292 A | 7/1998 | Muraishi et al. |
| 5,871,318 A * | 2/1999 | Dixon ................ B60N 2/01558 |
| | | 410/104 |
| 6,059,345 A | 5/2000 | Yokota |
| 6,260,813 B1 | 7/2001 | Whitcomb |
| 6,488,250 B1 | 12/2002 | Munch |
| 7,520,090 B2 | 4/2009 | Gerhart |
| 7,637,705 B2 | 12/2009 | Girardin et al. |
| 8,920,085 B2 | 12/2014 | Hudson et al. |
| 9,150,141 B2 | 10/2015 | Daouk |
| 9,663,232 B1 | 5/2017 | Porter et al. |
| 9,896,001 B1 | 2/2018 | Brodish |
| 9,919,624 B2 | 3/2018 | Cziomer et al. |
| 10,005,558 B2 | 6/2018 | Cailleteau |
| 10,569,669 B2 | 2/2020 | Dry et al. |
| 10,787,263 B2 | 9/2020 | Jacobson et al. |
| 10,829,225 B2 | 11/2020 | Doughty et al. |
| 11,040,639 B2 | 6/2021 | Condamin et al. |
| 11,358,497 B2 | 6/2022 | Moulin et al. |
| 2006/0263164 A1 | 11/2006 | Dowty et al. |
| 2011/0133030 A1 | 6/2011 | Kennedy et al. |
| 2014/0191081 A1 | 7/2014 | Ward et al. |
| 2018/0327097 A1 | 11/2018 | Loose et al. |
| 2019/0345963 A1 | 11/2019 | Mochizuki et al. |
| 2020/0307806 A1 | 10/2020 | Wilcynski et al. |
| 2021/0261170 A1 | 8/2021 | Moulin |
| 2022/0025918 A1 * | 1/2022 | Head ...................... F16B 35/005 |
| 2022/0032821 A1 | 2/2022 | Parker et al. |

FOREIGN PATENT DOCUMENTS

| | | |
|---|---|---|
| DE | 202005012828 U1 | 2/2006 |
| DE | 102004060718 A1 | 6/2006 |
| DE | 102006022032 A1 | 12/2006 |
| DE | 102005023007 | 1/2007 |
| DE | 102010017038 A1 | 2/2011 |
| DE | 102010055364 A1 | 6/2012 |
| DE | 102017109669 A1 | 11/2018 |
| EP | 0215495 A2 | 5/1991 |
| EP | 2295318 B1 | 7/2012 |
| EP | 2445786 B1 | 11/2013 |
| EP | 3301022 A1 | 4/2018 |
| EP | 3322642 B1 | 10/2020 |
| EP | 3626618 A1 | 10/2022 |
| FR | 2864481 A1 | 7/2005 |
| FR | 3111330 A1 | 12/2021 |
| GB | 2426549 A | 11/2006 |
| GB | 2594016 A | 10/2021 |
| KR | 2019990020423 U | 6/1999 |
| WO | 2014110403 A1 | 7/2014 |
| WO | 2015198278 A1 | 12/2015 |
| WO | 2016049356 A1 | 3/2016 |
| WO | 2019115590 A1 | 6/2019 |
| WO | 2022075968 A1 | 4/2022 |

OTHER PUBLICATIONS

Extended European Search Report dated Nov. 30, 2023, European Application No. 23187573.3.

* cited by examiner

TRACK LOCKING SYSTEM FOR AN AIRCRAFT SEAT

CROSS-REFERENCE TO RELATED APPLICATIONS

The present application claims the benefit under 35 U.S.C. § 119 (e) of U.S. Provisional Application No. 63/391,998, filed Jul. 25, 2022, which is incorporated herein by reference in the entirety.

TECHNICAL FIELD

The present invention generally relates to an aircraft seat safety system and, more particularly, to a locking system for an aircraft track.

BACKGROUND

Modern aircraft seats typically include adjustment mechanisms which allows the aircraft seat to translate along an aircraft track. These translatable aircraft seats include at least one position, along a standard aircraft track, where the track foot is between metered positions and the aircraft seat may become detached from the aircraft track. For safety purposes, it is necessary to retain the aircraft seat within the confines of the aircraft track so that the seat does not inadvertently become dislodged or removed from the aircraft track. Therefore, it would be desirable to provide a track locking system for an aircraft seat configured to address one or more shortcomings of the previous approaches.

SUMMARY

A track locking system is disclosed, in accordance with one or more embodiments of the present disclosure. In some embodiments, the track locking system includes a track lock. In some embodiments, the track lock may include a base which fits within a seat track and secures a seat to the seat track when one or more seat track feet are between a metered position. In some embodiments, the track lock may include a shaft coupled to the base. In some embodiments, the track lock may include a locking hole and a confinement hole. In some embodiments, the track locking system may include a through hole which connects tow opposite faces of a seat structure, where the shaft of the track lock is able to fit within the through hole. In some embodiments, the track locking system may include a locking cavity cut through one or more faces of the seat structure other than the two opposite faces of the seat structure connected via the through hole. In some embodiments, the track locking system may include a locking member, where a first end of the locking member is secured by the one or more recesses and a second end of the locking member is secured by the locking hole, where the locking member and the locking hole mate via the locking cavity. In some embodiments, the track locking system may include a confinement member secured by the confinement hole via the through hole.

A track lock is disclosed, in accordance with one or more embodiments of the present disclosure. In some embodiments, the track lock may include a base which fits within a seat track and secures a seat to the seat track when one or more seat track feet are between a metered position. In some embodiments, the track lock may include a shaft coupled to the base which fits within a through hole. In some embodiments, the track lock may include a locking hole, where a first end of a locking member is secured by one or more recesses and a second end of the locking member is secured by the locking hole, where the locking member and the locking hole mate via a locking cavity. In some embodiments, the track lock may include a confinement hole, where a confinement member is secured by the confinement hole via the through hole.

A method is disclosed, in accordance with one or more embodiments of the present disclosure. In some embodiments, the method may include, but is not limited to, positioning a seat structure of a seat above a seat track. In some embodiments, the method may include, but is not limited to, aligning one or more feet lobes of one or more seat track feet with one or more scallops of the seat track. In some embodiments, the method may include, but is not limited to, lowering the one or more feet lobes into the one or more scallops of the seat track. In some embodiments, the method may include, but is not limited to, positioning one or more track locking systems above the one or more scallops in the seat track, where a base of a track lock of each of the one or more track locking systems is located above the one or more scallops and the one or more feet lobes are located under one or more track tabs. In some embodiments, the method may include, but is not limited to, removing a locking member from a locking hole on the track lock, where the locking member was located at a first recess on the track locking system. In some embodiments, the method may include, but is not limited to, lowering the base of the track lock into the one or more scallops by sliding the track lock along a through hole. In some embodiments, the method may include, but is not limited to, inserting the locking member into the locking hole on the track lock, where the locking member is located at a second recess on the track locking system. In some embodiments, the method may include, but is not limited to, sliding the seat to a position, where the seat track feet are in a metered position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
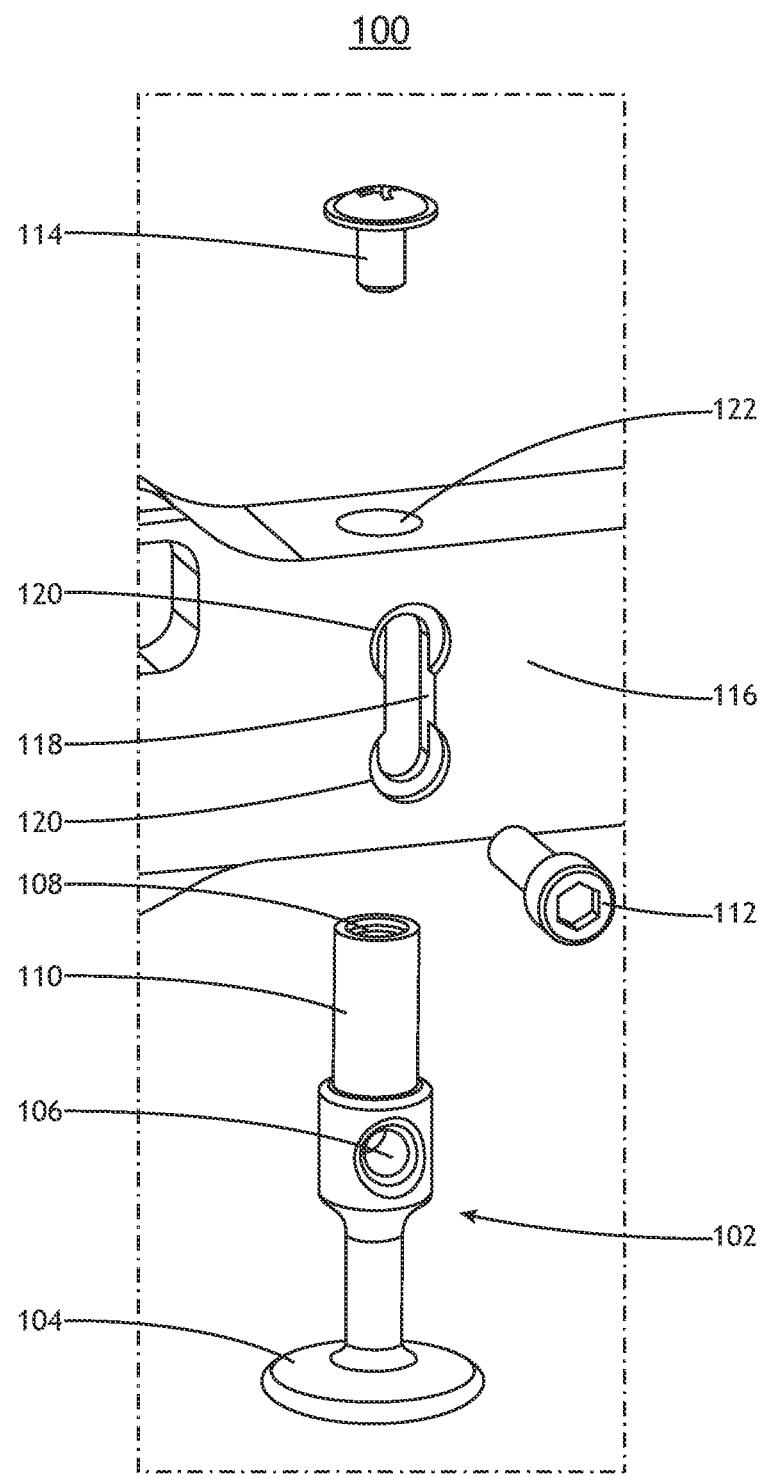
FIG. 1A is an exploded view of the track locking system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

A track locking system is disclosed, in accordance with embodiments of the present disclosure. In some aircraft, the seats may be translatable. This may allow for adjustments in distance between two seats, or adjustments between two rows of seats. However, for a seat that can translate (e.g., tracking) there exists a temporary position between metered positions where the lobes on the seat track feet (e.g., the main seat to aircraft attachment) are "in phase" with the scallops (e.g., cutouts on the seat track to allows the aircraft seat to be installed) on the seat track. This creates the potential for the seat to become inadvertently dislodged from the confines of the seat track. However, the track locks (e.g., of the track locking system) are designed to be "out of phase" at this point and are positioned under the seat track tabs thus preventing any dislodgement of the seat. When the seat reaches its metered position, the feet lobes then return to being positioned under the aircraft track tabs, with the track locks positioned in line with the scallops.

The track locking system, as disclosed herein may provide for numerous benefits over current seat tracks. For example, track locking system may provide a visual indicator to indicate whether the seat is properly locked. The track locking system may also provide redundancy when compared to safety measures for a seat track without the track locking system. Further, the track locking system may be easy to install, and therefore user-friendly. Additionally, the track locking system may be installable without the need for special tooling.

Aircraft seats installed within an avionics environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

FIGS. 1A-8 generally depict a track locking system 100, in accordance with one or more embodiments of the present disclosure.

FIG. 1A is an exploded view of the track locking system 100, in accordance with one or more embodiments of the present disclosure.

In embodiments, the track locking system 100 includes a track lock 102. The track lock may further include a base 104, a locking hole 106, a confinement hole 108, and a shaft 110.

For example, the base 104 of the track lock 102 and the shaft 110 of the track lock 102 may be coupled in such a way that the shaft 110 is perpendicular to a face of the base 104.

The track locking system 100 may further include a locking member 112. For example, the locking member 112 may be configured to mate with the locking hole 106 such that the track lock 102 is locked in a first position (e.g., an up position) or a second position (e.g., a down position) within the track locking system 100 when the locking member is engaged.

The track locking system 100 may further include a confinement member 114. For example, the confinement member 114 may be configured to mate with the confinement hole 108 such that the track lock 102 is secured (e.g., the track lock 102 is retained within the track locking system 100) when the locking member 112 is not engaged.

The locking member 112 and the confinement member 114 may include any fastening means known in the art capable of securing two structures in place. For example, the locking member 112 and/or the confinement member 114 may include, but are not limited to, a bolt, a screw, or the like.

The track locking system 100 may also include a seat structure 116. The seat structure may include a locking cavity 118, one or more recesses 120, and a through hole 122. The locking cavity 118, the one or more recesses 120, and the through hole 122 may be cut into the seat structure 116. For example, the through hole 122 may be a hole connecting two opposite faces of the seat structure 116 (e.g., a top face and a bottom face of the seat structure 116). Further, the locking cavity 118 may be cut through one or more of the faces of the seat structure 116 such that the through hole 122 does not connect (e.g., one or more side faces of the seat structure 116).

The one or more recesses 120 may be cut into the seat structure 116 in the same location as the locking cavity 118. The one or more recesses 118 may also have one or more dimensions larger than the locking cavity 118 (e.g., a diameter of the one or more recesses 120 may be larger than a width of the locking cavity 118). Further, the depth of the one or more recesses 120 may be less than the depth of the locking cavity 118. In this way, the one or more recesses 120 may secure the locking member 112 in place (e.g., the one or more recesses 120 may secure the head of a bolt or screw in place). This may eliminate or greatly reduce translational motion of the track lock 102 when the locking member 112 is secured (e.g., greatly eliminate or reduce up/down motion of the track lock).

For example, the one or more recesses 120 may include a counterbored hole. Further, the locking member 112 may include, but is not limited to, a screw, a bolt, a pin, or the like. In this way, the head of the locking member 112 (e.g., the head of a screw, a bolt, or a pin) may fit within the one or more recesses 120.

The track lock 102 may fit within the through hole 122. The through hole 122 may be cut to such a size so that it is larger than the track lock 102 (e.g., the track lock 102 may freely slide into and out of the through hole 122). The through hole 122 may also serve to keep the track lock 102 positioned within the track locking system 100 when the confinement member 114 is mated with the confinement hole 108 (e.g., the base 104 of the locking member 102 and the confinement member 114 (e.g., a head of a screw serving as the confinement member 114) are larger than the through hole 122).

Figure 1B:
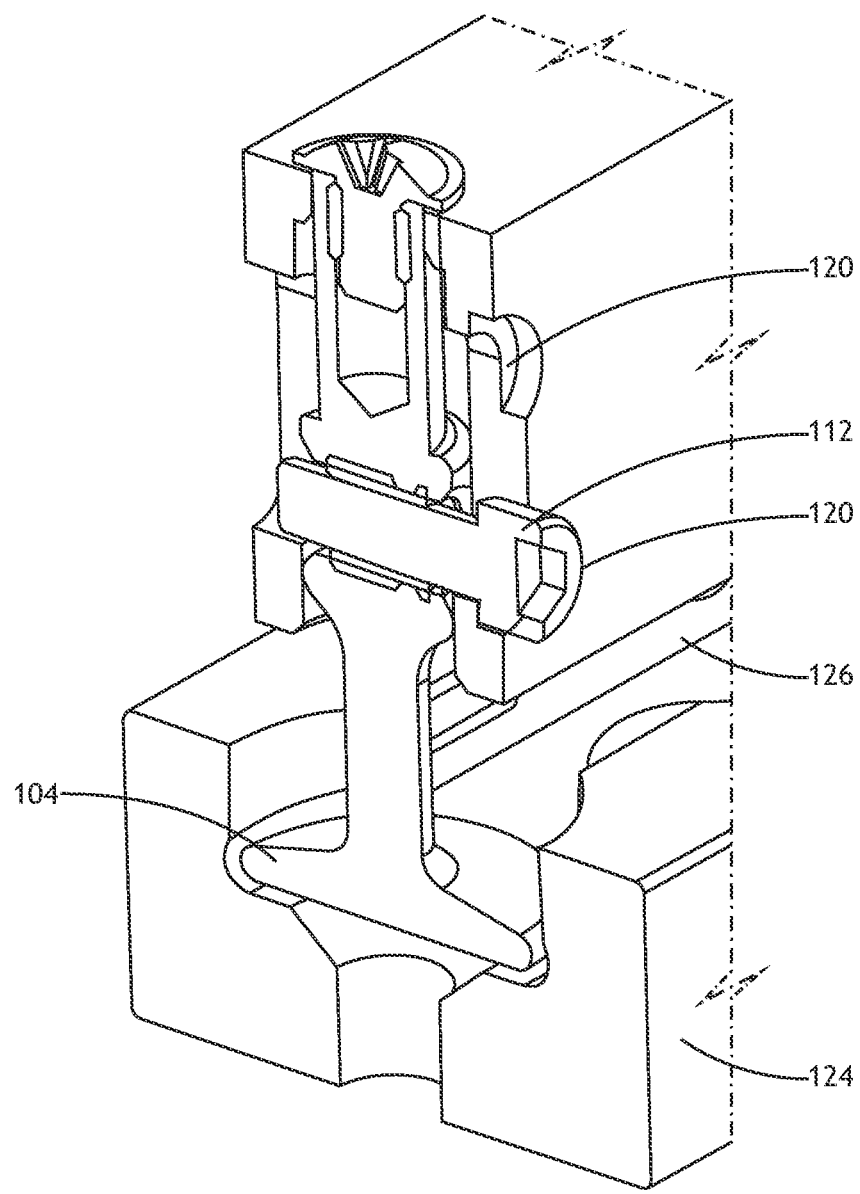
FIG. 1B is a cross-sectional view of the track locking system interfacing with a portion of an aircraft track, in accordance with one or more embodiments of the present disclosure.

FIG. 1B is a cross-sectional view of the track locking system 100 in an aircraft track 124, in accordance with one or more embodiments of the present disclosure.

For example, FIG. 1B shows the track lock 102 in a second position (e.g., a down position). In the second position, the locking member 112 may be positioned within a recess 120 (e.g., a lower recess of the one or more recesses 120) that allows the base to fit within a slot 126 of the seat track 124. It can be seen in FIG. 1B, that the locking member 112 goes across the locking cavity 118 in a way that prevents translational motion of the track lock 102.

In embodiments, it may be advantageous for the base 104 to have approximately the dimensions as the slot 126 (e.g., the base 104 is approximately the same size and shape as the material cut away from the aircraft track 124 to form the slot 126).

Figure 1C:
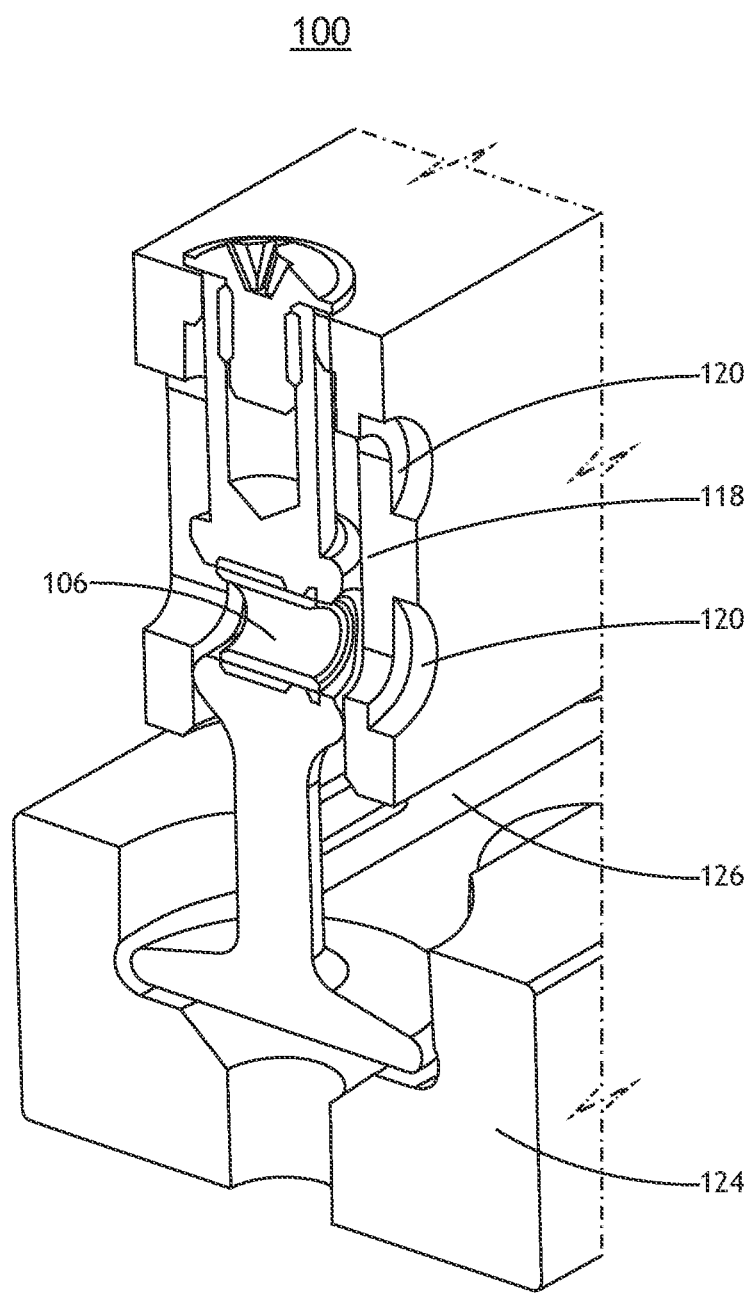
FIG. 1C is a cross-sectional view of the track locking system interfacing with a portion of an aircraft track without a locking member, in accordance with one or more embodiments of the present disclosure.

FIG. 1C is a cross-sectional view of the track locking system 100 in an aircraft track 124 without the locking member 112, in accordance with one or more embodiments of the present disclosure. In this way, the alignment between the locking hole 106, locking cavity 118, and the one or more recesses 120 can be seen when the track lock 102 is in a second position.

Figure 2A:
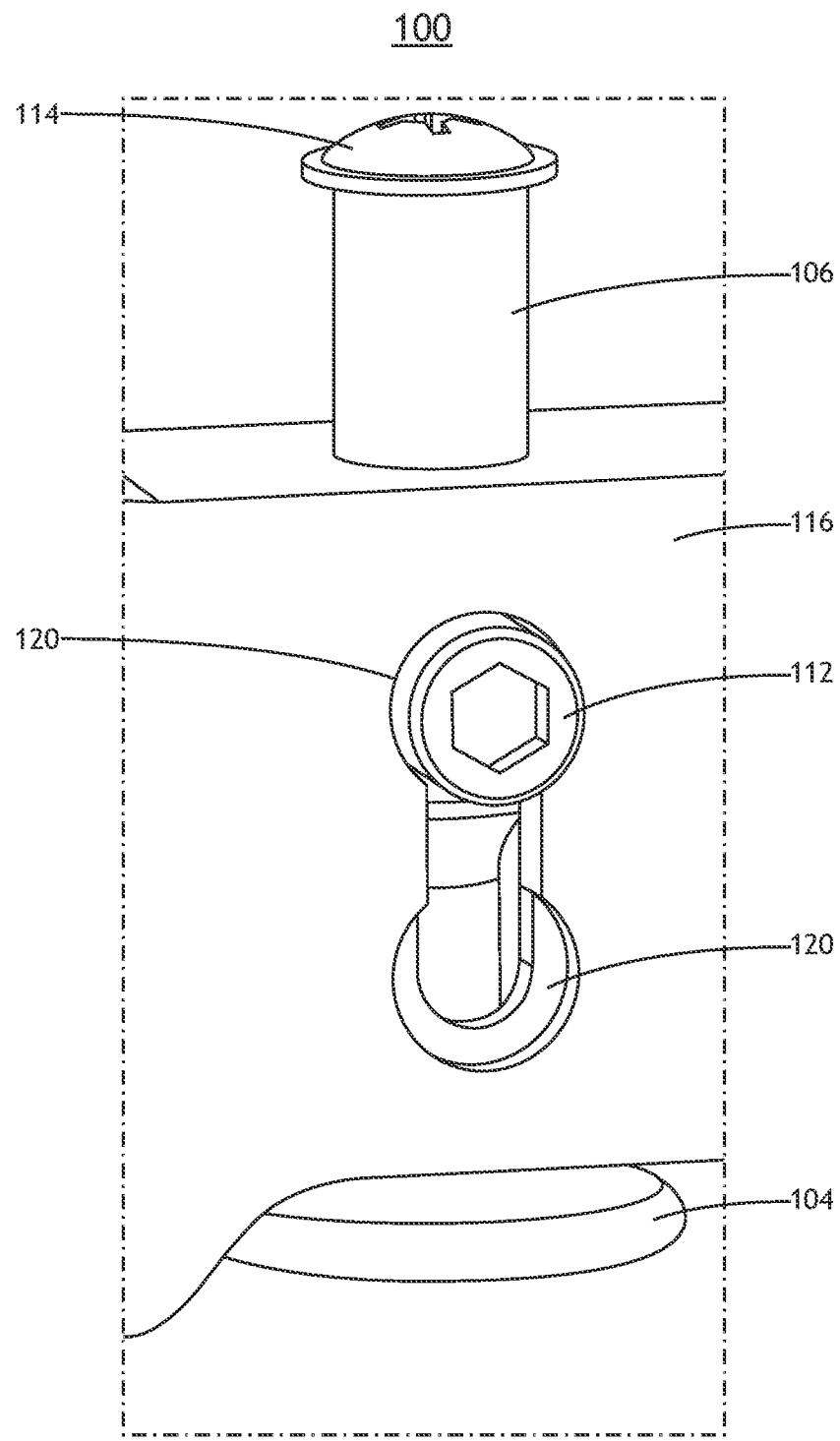
FIG. 2A is a side view of the track locking system in a first position, in accordance with one or more embodiments of the present disclosure.
Figure 2B:
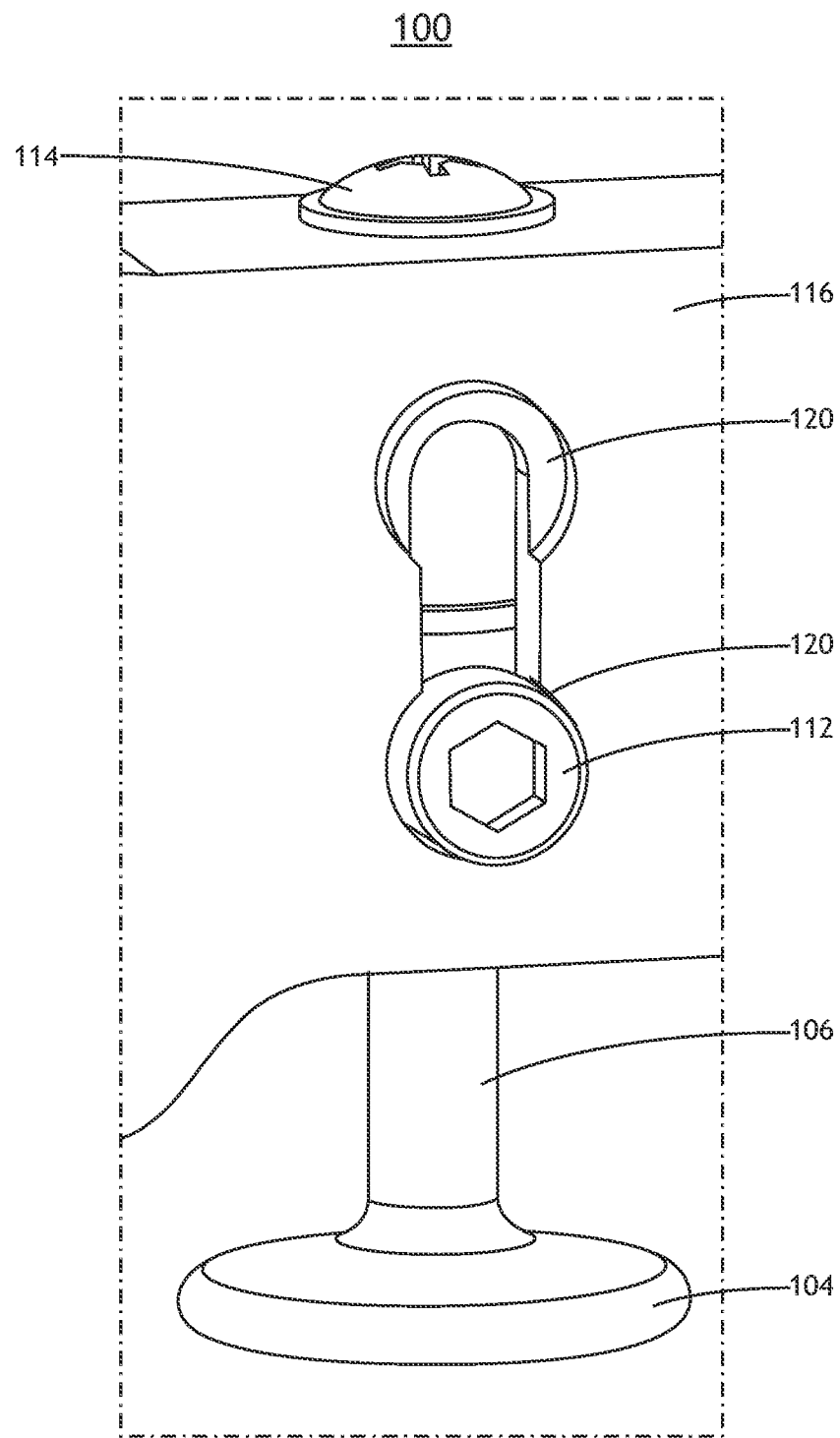
FIG. 2B is a side view of the track locking system in a second position, in accordance with one or more embodiments of the present disclosure.

FIG. 2A is a side view of the track locking system 100 in a first position (e.g., an up position), in accordance with one or more embodiments of the present disclosure. FIG. 2B is a side view of the track locking system 100 in a second position (e.g., a down position), in accordance with one or more embodiments of the present disclosure.

For example, in FIG. 2A, the base 104 of the track lock 102 is in a raised position at or near the base of the seat structure 116 and the confinement member 114 is raised above the surface of the seat structure 116. Further, the locking member 112 is locked into an upper recess of the one or more recesses 120. The first position depicted in FIG. 2A may be used when the aircraft seat of the track locking system 100 is being transported or stowed.

By way of another example, in FIG. 2B, the base 104 of the track lock 102 is in a lowered position away from the base of the seat structure 116 and the confinement member 114 is at or near the surface of the seat structure 116. Further, the locking member 112 is locked into a lower recess of the one or more recesses 120. The second position depicted in FIG. 2B may be used when the aircraft seat of the track locking system 100 is coupled to an aircraft track 124. It is noted herein that the seat may be integrated within an aircraft or any other vehicle type.

In FIGS. 2A and 2B, the location of the locking member 112 (e.g., what recess 120 the locking member 112 is in) and the location of the confinement member 114 (e.g., whether the confinement member 114 is in a raised or a lowered position) may provide visual indications of whether the track locking system 100 is engaged (e.g., the second position) or disengaged (e.g., the first position).

Figure 3A:
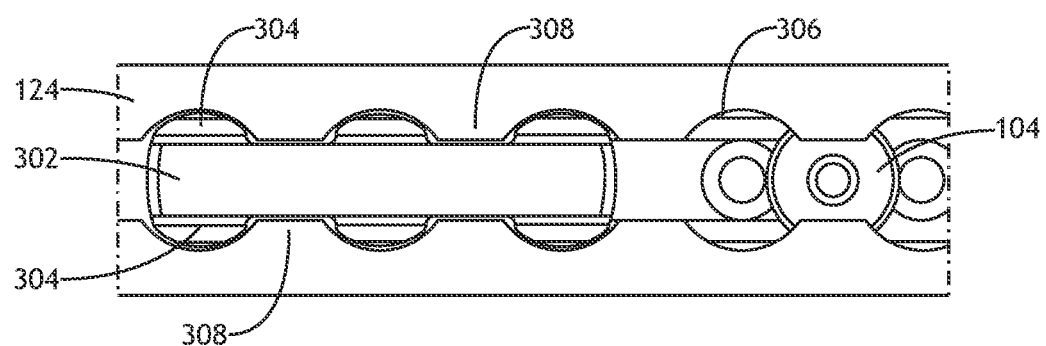
FIG. 3A is a top view of an aircraft seat track foot between metered positions, in accordance with one or more embodiments of the present disclosure.

FIG. 3A is a top view of an aircraft seat track foot 302 between metered positions, in accordance with one or more embodiments of the present disclosure.

For example, in FIG. 3A one or more feet lobes 304 of the track foot 302 are aligned with scallops 306 on the aircraft track 124. Therefore, without the track lock 102 nothing would hold the aircraft seat in place. However, in FIG. 3A, the track lock 102 aligns with track tabs 308. Therefore, the seat lock 102 and the track tabs 308 prevent the seat from being lifted out of place.

Figure 3B:
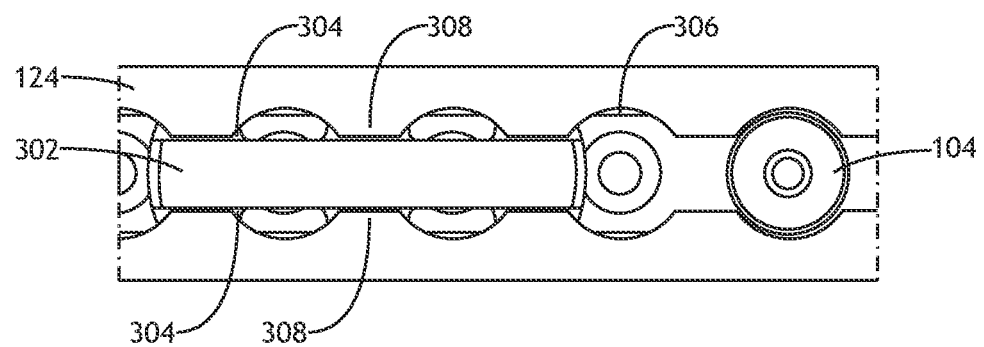
FIG. 3B is a top view of the aircraft seat track foot at metered positions, in accordance with one or more embodiments of the present disclosure.

FIG. 3B is a top view of an aircraft seat track foot 302 at metered positions, in accordance with one or more embodiments of the present disclosure.

For example, in FIG. 3B the one or more feet lobes 304 are aligned with track tabs 308 on the aircraft track 124. Further, in FIG. 3B, the track lock 102 aligns with the scallops 306 on the aircraft track 124. Therefore, the track tabs 308 hold the seat in place due to its alignment with the track tabs 308, while the track lock 102 does not hold the seat in place due to its alignment with the scallops 306.

Figure 3C:
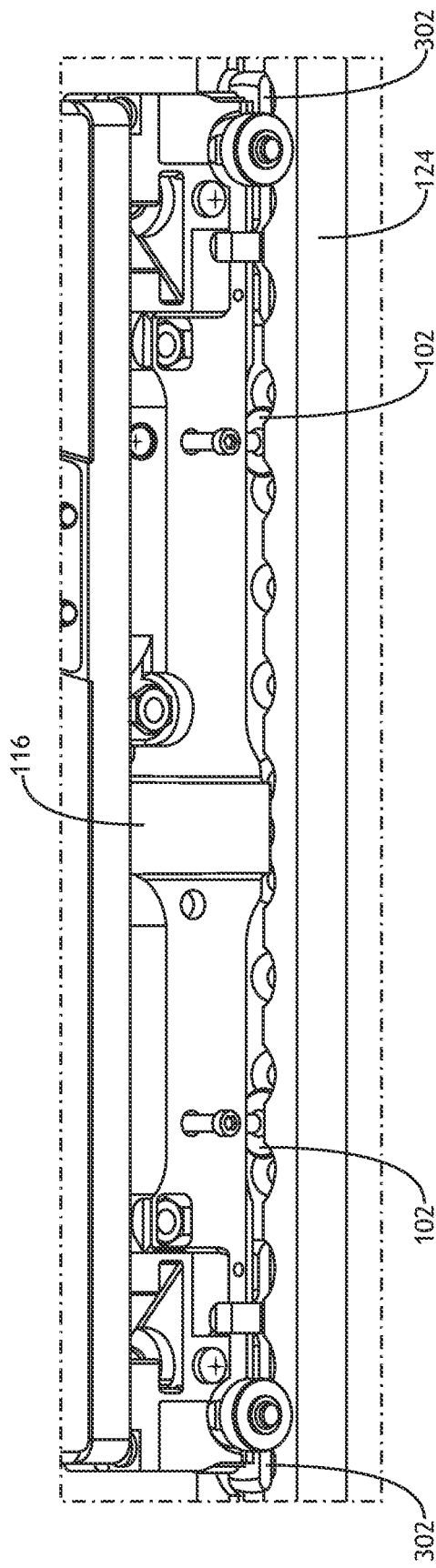
FIG. 3C is a perspective view of the track locking system securing an aircraft seat to the aircraft track, in accordance with one or more embodiments of the present disclosure.

FIG. 3C shows two track locking systems 100 retaining the aircraft seat to the aircraft track 124, in accordance with one or more embodiments of the present disclosure.

For example, FIG. 3C shows how the track locking system 100 may be deployed on the seat structure 116 of a seat assembly. Further, FIG. 3C shows the seat track feat 302 between metered positions. In this way, the track lock 102 of the track locking system 100 is able to secure the seat in place.

Figure 3D:
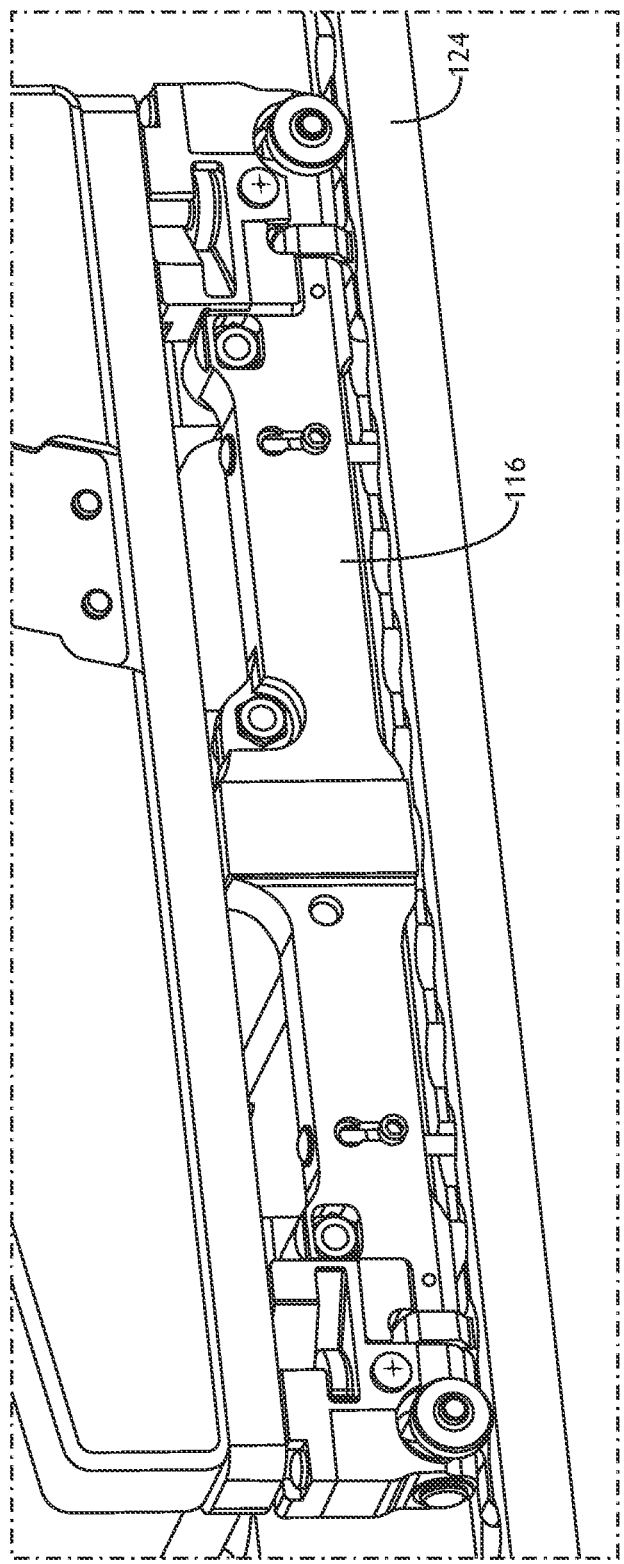
FIG. 3D is a perspective view of the track locking system securing an aircraft seat to the aircraft track, in accordance with one or more embodiments of the present disclosure.

FIG. 3D is a side view of the track locking system 100 securing an aircraft seat to a seat structure 116, in accordance with one or more embodiments of the present disclosure.

For example, FIG. 3D shows and example of the seat track feet 302 holding the seat in place (e.g., with feet lobes 304 and track tabs 308). Further, FIG. 3D shows the seat track feat 302 at metered positions. In this way, the track lock 102 of the track locking system 100 is aligned with one or more scallops 306 on the aircraft track 124 and is not able to secure the seat in place.

Figure 4:
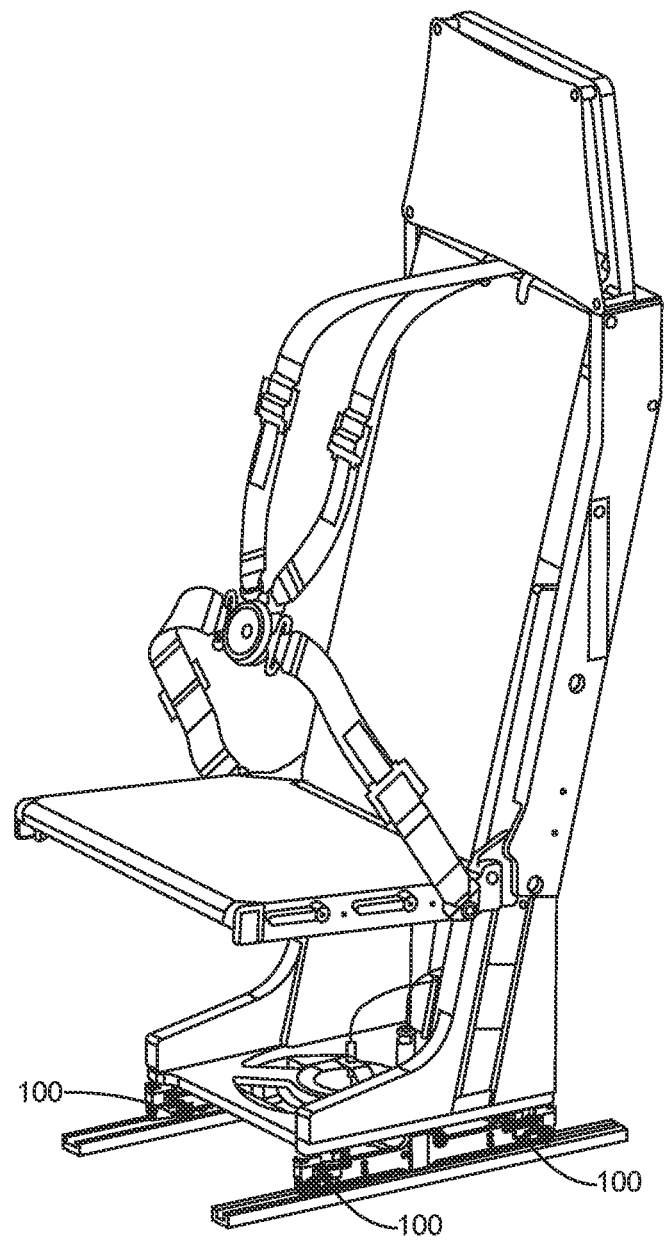
FIG. 4 is a perspective view of an aircraft seat illustrating an integrated tracking system, in accordance with one or more embodiments of the present disclosure.

FIG. 4 is a perspective view of an aircraft seat using the track locking system 100, in accordance with one or more embodiments of the present disclosure.

In embodiments, an aircraft seat may have four track locking systems 100. For example, each seat may have a seat structure 116 (e.g., a seat structure 116 configured to couple to a bottom portion of an aircraft seat frame). Each seat structure 116 may further include two track locking systems 100 (e.g., a track locking system 100 at or near one end of the seat structure 116 and a track locking system 100 at or near an opposite end of the seat structure 116).

Referring now to FIGS. 5A-6D, different views of the lock system 100 are shown illustrating the steps taken to install an aircraft seat into an aircraft track 124, in accordance with one or more embodiments of the present disclosure. While the steps in FIGS. 5A-5D and FIGS. 6A-6D both may include sets containing four steps (e.g., a first step through a fourth step), it should be noted that the steps depicted in FIGS. 5A-5D may not depict the same step as those depicted in FIGS. 6A-6D (e.g., the step depicted in FIG. 5A may be different than the step depicted in FIG. 6A, the step depicted in FIG. 5B may be different than the step depicted in FIG. 6B, and so on).

In FIGS. 5A-5D, a side view of steps taken to secure an aircraft seat to a seat track 124 using one or more track locking systems 100 are shown, in accordance with one or more embodiments of the present disclosure.

Figure 5A:
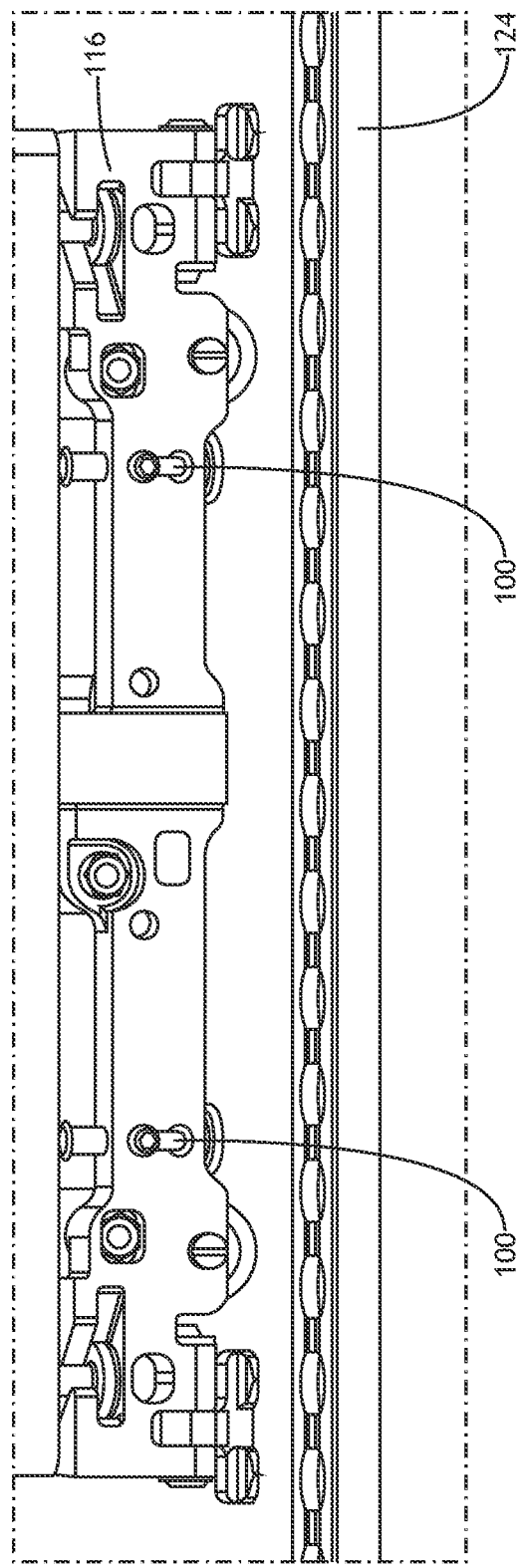
FIG. 5A is a side view of the track locking system illustrating a first step for securing the aircraft seat to the aircraft track, in accordance with one or more embodiments of the present disclosure.

FIG. 5A is a side view of the track locking system 100 illustrating a first step for securing the aircraft seat to the aircraft track, in accordance with one or more embodiments of the present disclosure.

For example, in FIG. 5A, the aircraft seat, including the seat structure 116 and track locking system 100, may be aligned over a seat track 124. This alignment may correspond to one or more feet lobes 304 of the seat track feet 302 aligning with one or more scallops 306 on the aircraft track 124.

Figure 5B:
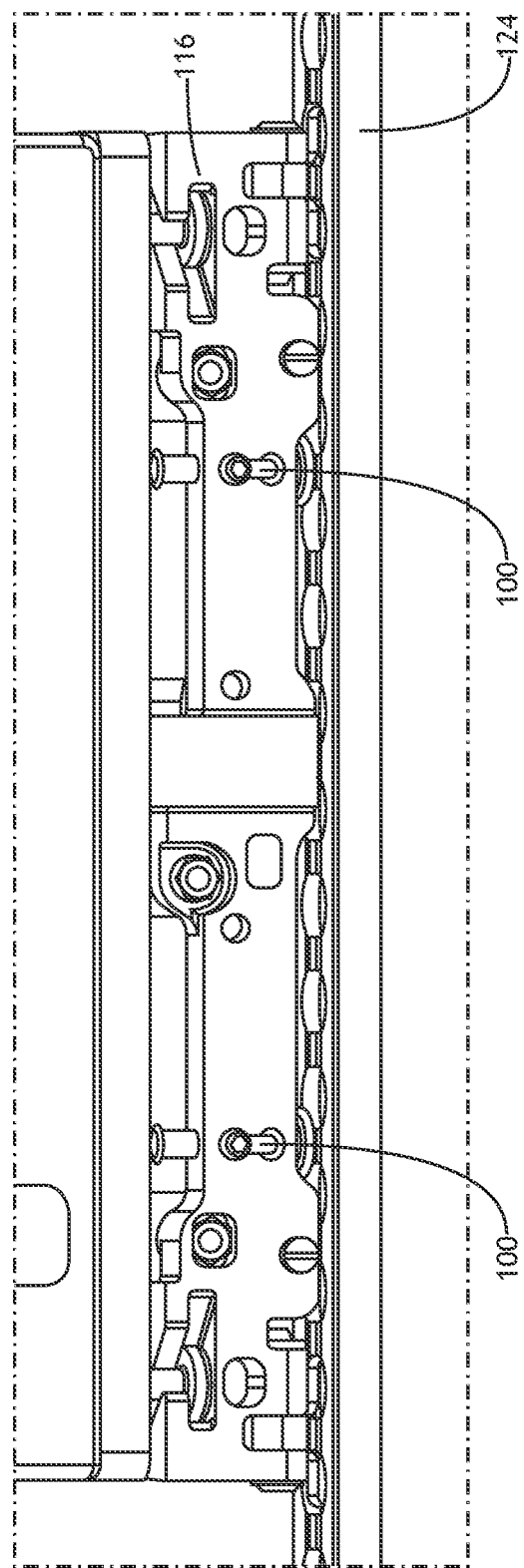
FIG. 5B is a side view of the track locking system illustrating a second step for securing the aircraft seat to the aircraft track, in accordance with one or more embodiments of the present disclosure.

FIG. 5B is a side view of the track locking system 100 illustrating a second step for securing the aircraft seat to the aircraft track 124, in accordance with one or more embodiments of the present disclosure.

For example, in FIG. 5B, the aircraft seat may be lowered. In this way, the one or more feet lobes 304 may fit within the one or more scallops 306 of the aircraft track 124, allowing the one or more track feet 302 to sit within the aircraft track 124.

Figure 5C:
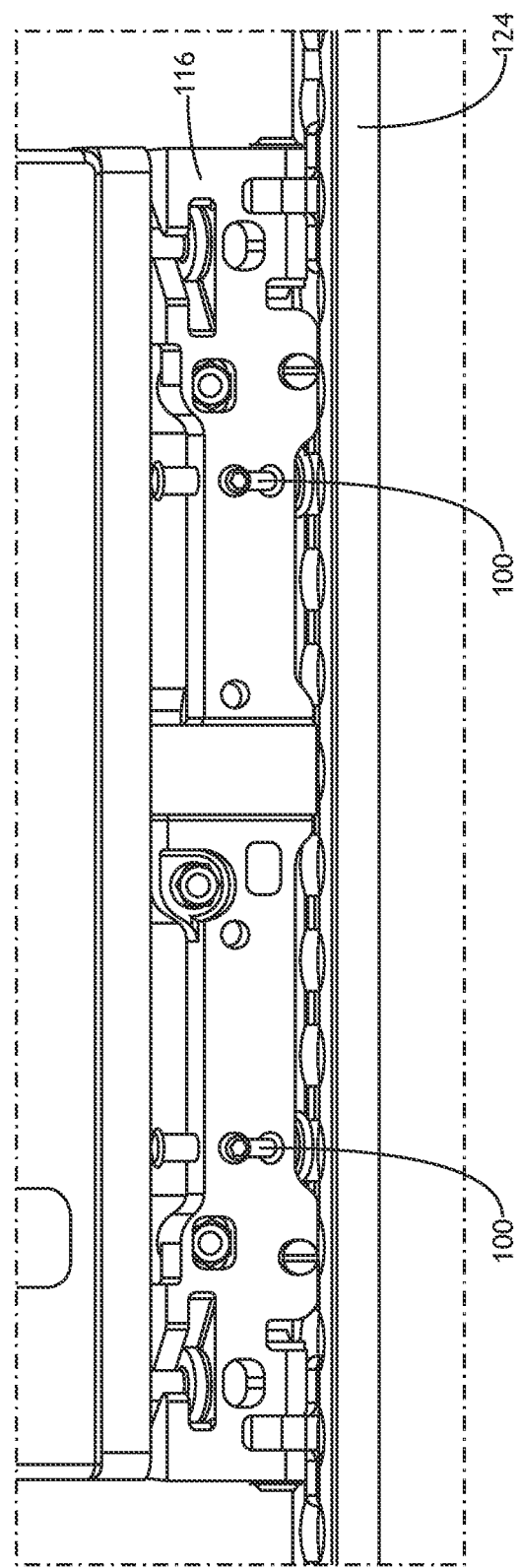
FIG. 5C is a side view of the track locking system illustrating a third step for securing the aircraft seat to the aircraft track, in accordance with one or more embodiments of the present disclosure.

FIG. 5C is a side view of the track locking system 100 illustrating a third step for securing the aircraft seat to the aircraft track 124, in accordance with one or more embodiments of the present disclosure.

For example, in FIG. 5C, the aircraft seat is adjusted so the one or more feet lobes 304 of the seat track feet 302 are aligned with track tabs 308 on the aircraft track 124 (e.g., the one or more track feet 302 are in a metered position). In this way, the base 104 of the track lock 102 aligns with the one or more scallops 306 on the aircraft track 124.

Figure 5D:
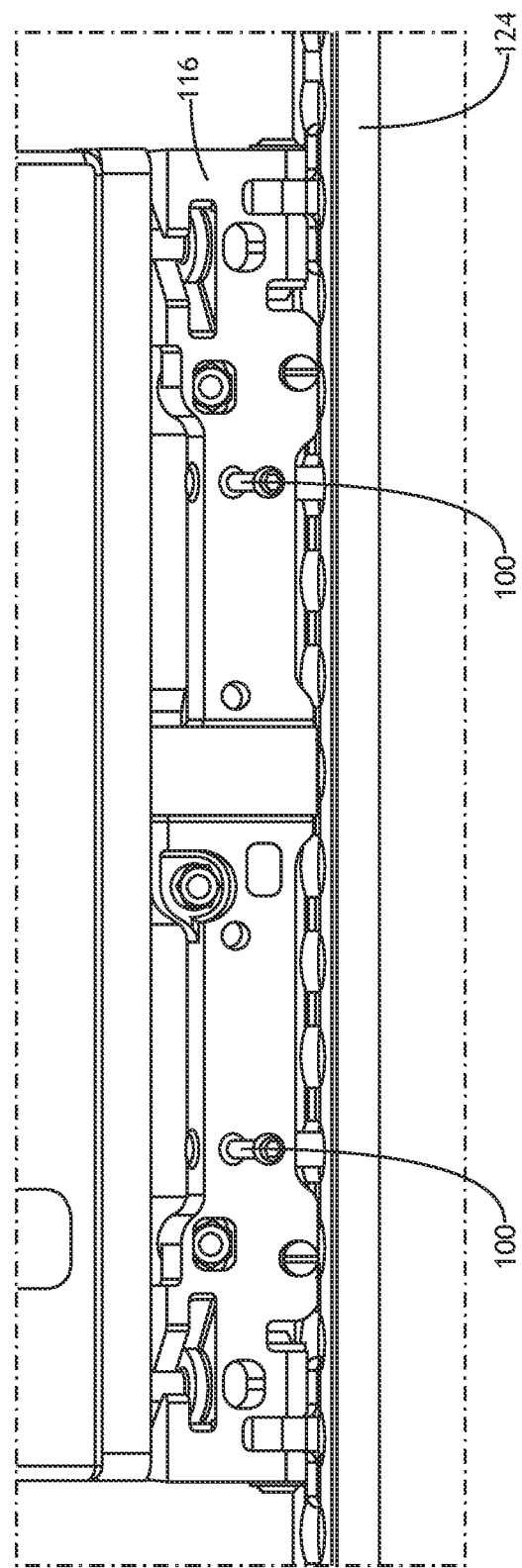
FIG. 5D is a side view of the track locking system illustrating a fourth step for securing the aircraft seat to the aircraft track, in accordance with one or more embodiments of the present disclosure.

FIG. 5D is a side view of the track locking system 100 illustrating a fourth step for securing the aircraft seat to the aircraft track 124, in accordance with one or more embodiments of the present disclosure.

For example, in FIG. 5D, the base 104 of the track lock 102 has been inserted into the aircraft track 124 (e.g., via the one or more scallops 306). Further, the difference between FIGS. 5C and 5D provide visual cues of the position of the track lock 102. In FIG. 5C, the confinement member 114 is located upwards from the top face of the seat structure 116, while in FIG. 5D, the confinement member is located on the top face of the seat structure 116. Further, in FIG. 5C, the locking member is positioned at a first recess 120 (e.g., a top recess 120), while in FIG. 5D, the locking member has moved to a second recess 120 (e.g., a bottom recess 120).

Figure 6A:
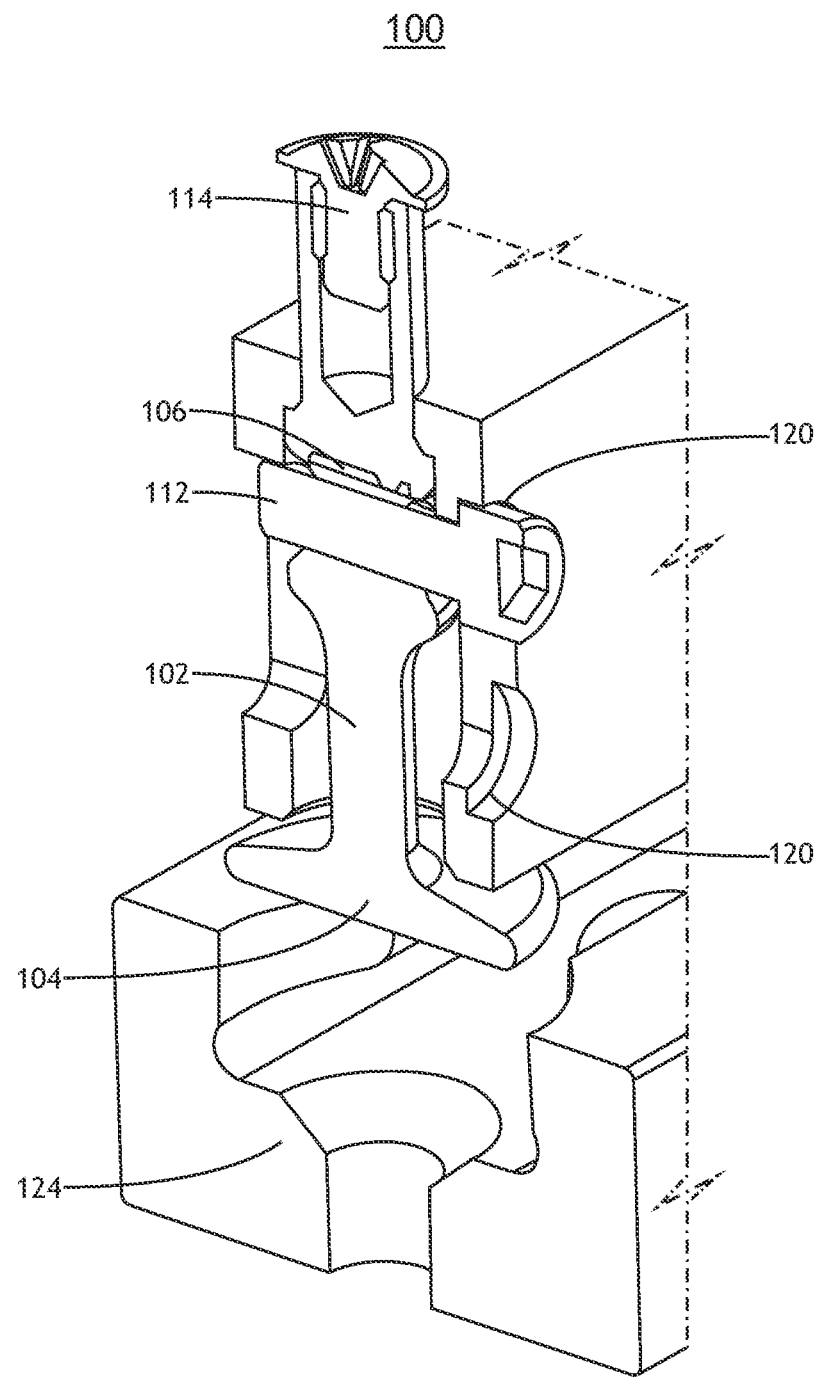
FIG. 6A is a cross-sectional view of the track locking system illustrating a first step for securing the aircraft seat to the aircraft track including positioning of a locking member, in accordance with one or more embodiments of the present disclosure.

FIG. 6A is a cross-sectional view of the track locking system 100 illustrating a first step for securing the aircraft seat to the aircraft track including positioning of a locking member 112, in accordance with one or more embodiments of the present disclosure.

For example, in FIG. 6A, the aircraft seat, including the seat structure 116 and track locking system 100, may be aligned over a seat track 124. This alignment may correspond to the one or more feet lobes 304 of the track feet 302 aligning with the one or more scallops 306 on the aircraft track 124. Further, the locking member 112 may be configured to fully insert into the locking hole 106 and is mated with a first recess 120 (e.g., a top recess 120).

Figure 6B:
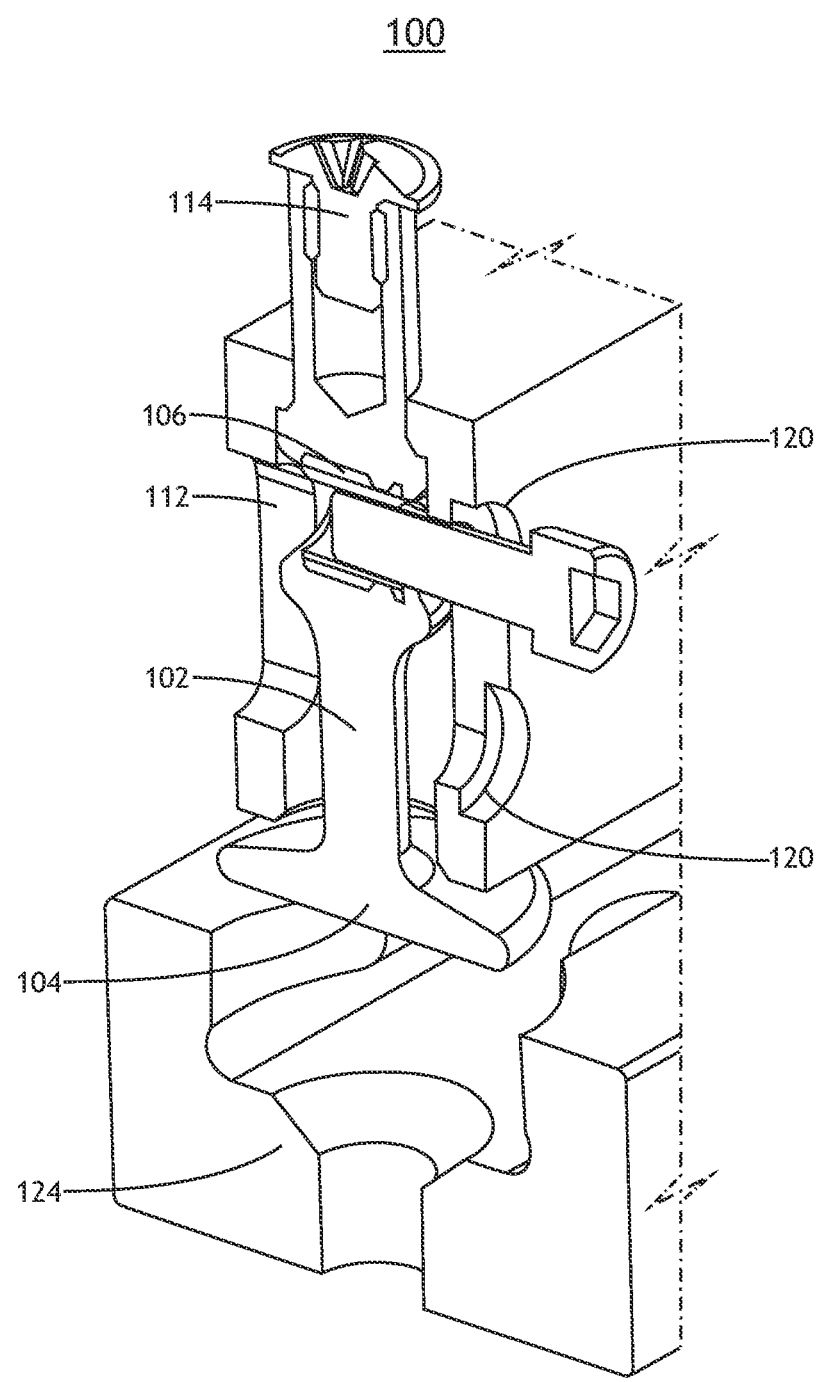
FIG. 6B is a cross-sectional view of the track locking system illustrating a second step for securing the aircraft seat to the aircraft track including positioning of a locking member, in accordance with one or more embodiments of the present disclosure.

FIG. 6B is a cross-sectional view of the track locking system 100 illustrating a second step for securing the aircraft seat to the aircraft track 124 100 including positioning of a locking member 112, in accordance with one or more embodiments of the present disclosure.

Further, as may be seen in FIG. 6B, the locking member 112 may be removed (e.g., partially removed or fully removed) from the locking hole 106 (e.g., moved from a first recess 120 (e.g., top recess 120) of the track locking system 100). In this way, the locking member 112 may slide along the locking cavity 118 and the track lock 102 may slide along the through hole 122.

Figure 6C:
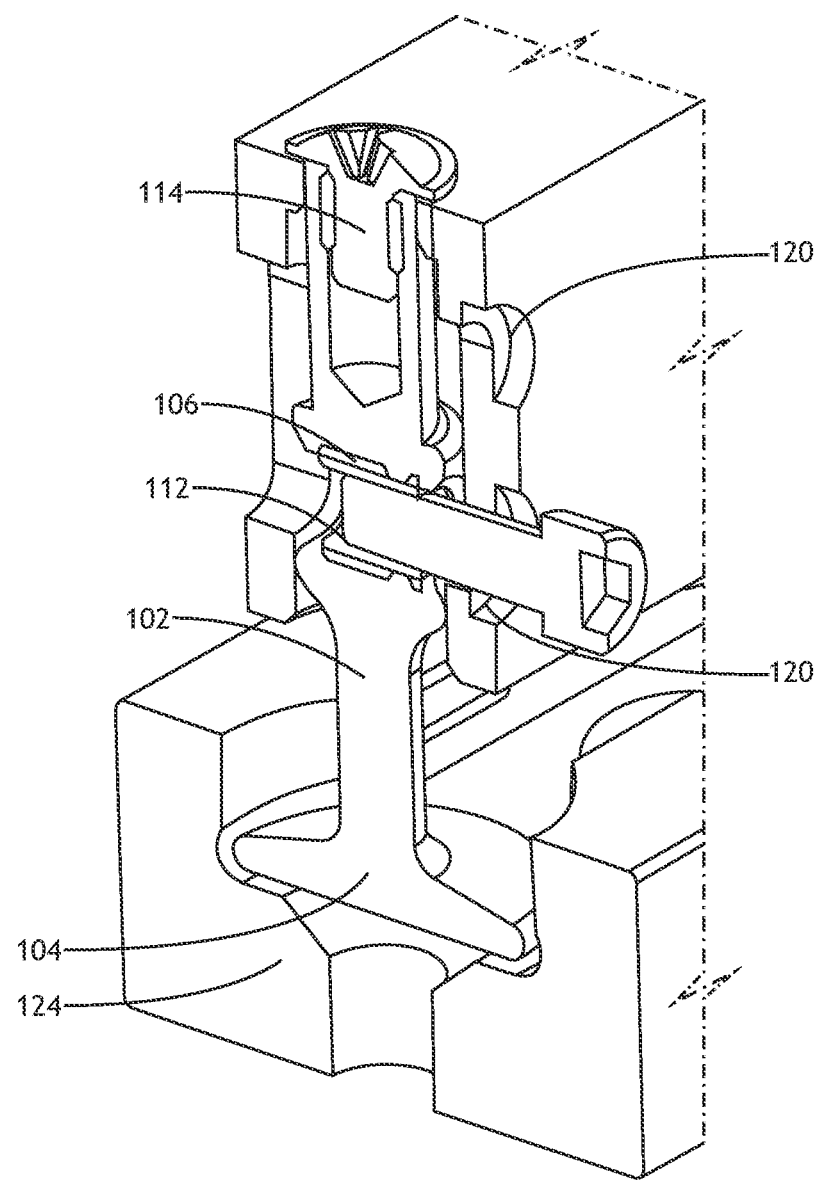
FIG. 6C is a cross-sectional view of the track locking system illustrating a third step for securing the aircraft seat to the aircraft track including positioning of a locking member, in accordance with one or more embodiments of the present disclosure.

FIG. 6C is a cross-sectional view of the track locking system 100 illustrating a third step for securing the aircraft seat to the aircraft track 124 including positioning of a locking member 112, in accordance with one or more embodiments of the present disclosure.

For example, in FIG. 5C, the base 104 of the track lock 102 has been inserted into the seat track 124 (e.g., via one or more scallops 306 of the seat track 124). Further, the confinement member 114 is not on the top face of the seat structure 116 and the locking member 112 is aligned with a second recess 120 (e.g., a bottom recess 120).

Figure 6D:
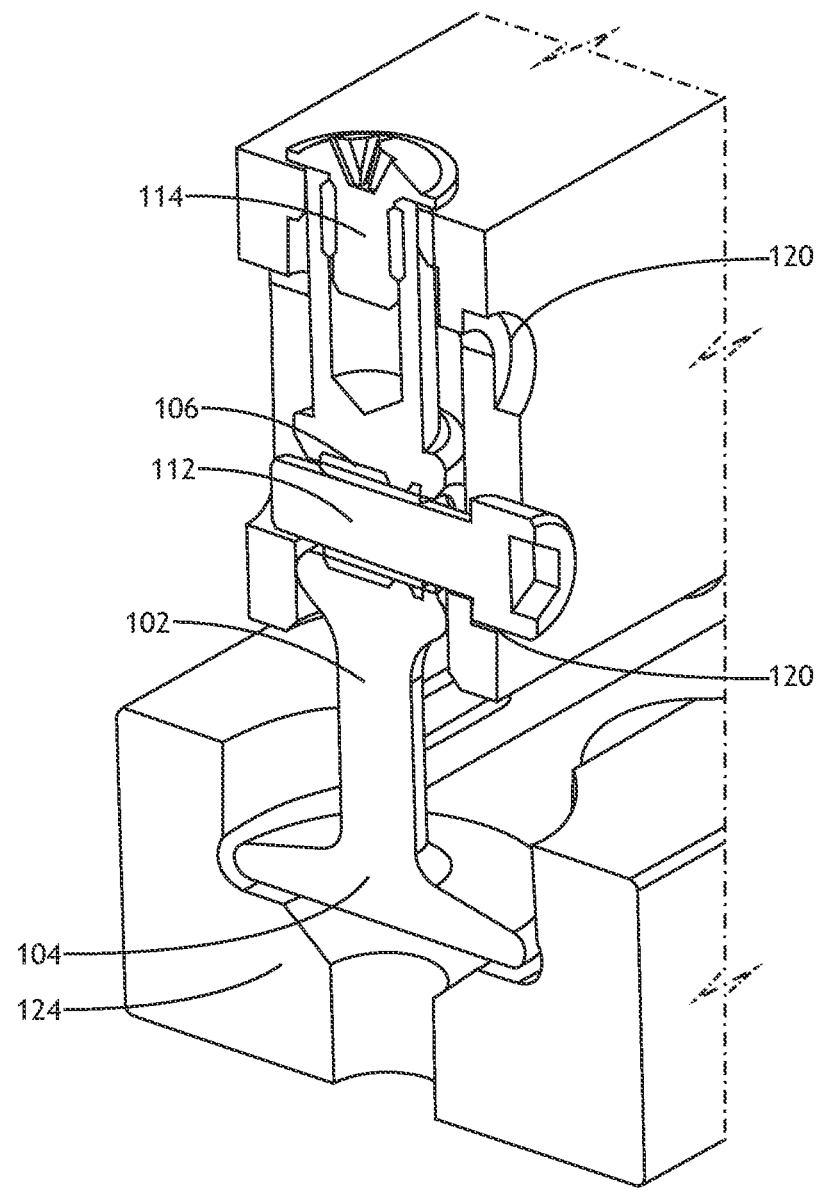
FIG. 6D is a cross-sectional view of the track locking system illustrating a fourth step for securing the aircraft seat to the aircraft track including positioning of a locking member, in accordance with one or more embodiments of the present disclosure.

FIG. 6D is a cross-sectional view of the track locking system 100 illustrating a fourth step for securing the aircraft seat to the aircraft track 124 including positioning of a locking member 112, in accordance with one or more embodiments of the present disclosure.

For example, in FIG. 6D, the locking member 112 has been fully inserted back into the locking hole 106. In this way, the locking member 112 is also within a second recess 120 (e.g., a bottom recess 120), thus locking the track lock 102 into place and preventing translation along the through hole 122.

Figure 7:
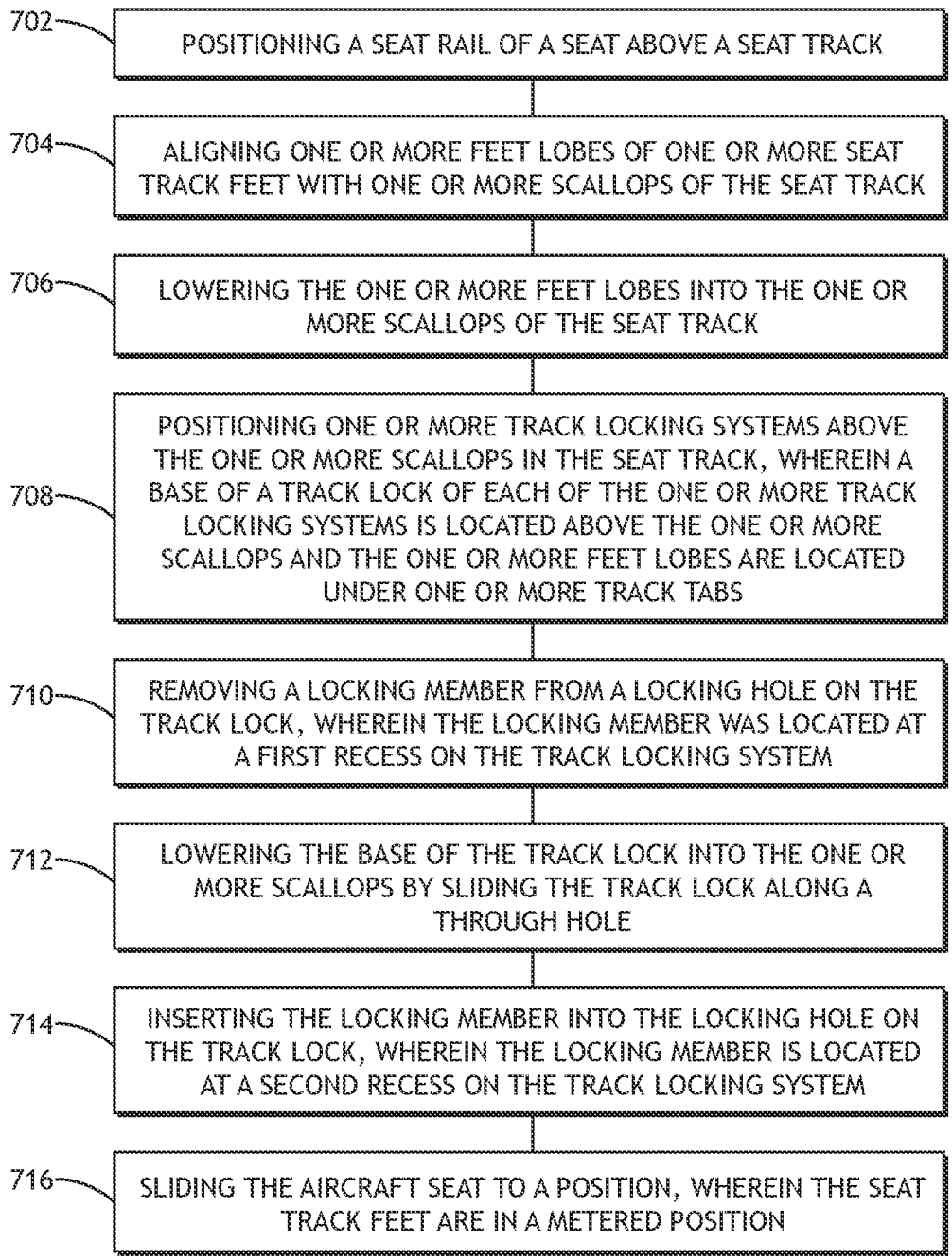
FIG. 7 is a flow diagram of a method for securing an aircraft seat to an aircraft track with the track locking system, in accordance with one or more embodiments of the present disclosure.

FIG. 7 is a flow diagram depicting a method 700 for using the track locking system 100, in accordance with one or more embodiments of the present disclosure. Applicant notes that the embodiments and enabling technologies described previously herein in the context of track locking system 100 should be interpreted to extend to the method 700. It is further noted, however, that the method 700 is not limited to the architecture of the track locking system 100.

In embodiments, the method 700 includes a step 702 of positioning a seat structure 116 of an aircraft seat above an aircraft track 124. For example, an aircraft seat may be lifted into place when the aircraft seats are being installed.

In embodiments, the method 700 includes a step 704 of aligning one or more feet lobes 304 of one or more seat track feet 302 with one or more scallops 306 of the aircraft track 124. For example, the feet lobes 304 may be smaller than the one or more scallops 306, and thus the feet lobes 304 can fit within the one or more scallops 306.

In embodiments, the method 700 includes a step 706 of lowering the one or more feet lobes 304 into the one or more scallops 306 of the seat track. For example, the feet lobes 304 may fit within the one or more scallops 306 and allow the track feet 302 to fit within the aircraft track 124.

In embodiments, the method 700 includes a step 708 of positioning one or more track locking systems 100 above the one or more scallops 306 in the aircraft track 124, wherein a base of the track lock 102 of each of the one or more track locking systems 100 is located above the one or more scallops 306 and the one or more feet lobes 304 are located under one or more track tabs 308. For example, after the track feet 302 have been inserted into the aircraft track 124, they may be slid such that they are at a metered position. The metered position of the track feet may correspond to an instance where the base of the track lock 102 is aligned with a scallop 306 of the aircraft track 124.

In embodiments, the method 700 includes a step 710 of removing a locking member 112 from a locking hole 106 on the track lock 102, wherein the locking member 112 was located at a first recess 120 on the track locking system 100. For example, the locking member 112 may be fully inserted into a locking hole 106 on the track lock 102 and be within a first recess 120 (e.g., a top recess). In order to move the track lock 102, the locking member 112 will have to be removed from at least the first recess 120. The locking member 112 may further be either fully removed or partially removed from the locking hole 106. In this way, the locking member 112 may slide along the locking cavity 118 and allow the track lock 102 to translate along the through hole 122.

In embodiments, the method 700 includes a step 712 of lowering the base of the track lock 102 into the one or more scallops 306 by sliding the track lock 102 along a through hole. For example, the track lock 102 may be translated down the through hole 122 such that the base of the track lock 102 enters the aircraft track 104 via the one or more scallops 306.

In embodiments, the method 700 includes a step 714 of inserting the locking member 112 into the locking hole 106 on the track lock 102, wherein the locking member 112 is located at a second recess 120 on the track locking system 100. For example, the locking member 112 may be inserted into a second recess 120 (e.g., a lower recess) to prevent the track lock 102 from moving (e.g., lock the track lock 102 in a lowered position).

In embodiments, the method 700 includes a step 716 of sliding the aircraft seat to a position, wherein the track feet 302 are in a metered position. For example, the track feet 302 may be slid along the aircraft track 124 to reach a desired position for the seat, where the track feet 302 are in a metered position. When the seat is slid along the aircraft track 124, the track lock 102 of the track locking system 100 may prevent the seat from coming out of the aircraft track 124 when the track feet 302 are between metered positions.

Although embodiments of the disclosure are directed to an aviation environment, it is noted herein the track locking system is not limited to use in an aviation environment. Therefore, the above description should not be interpreted as a limitation on the present disclosure but merely an illustration.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A track locking system comprising:
a track lock, wherein the track lock comprises:
a base, wherein the base fits within a seat track and secures a seat to the seat track when one or more seat track feet are between a metered position;
a shaft, wherein the shaft is coupled to the base;
a locking hole; and
a confinement hole;
a through hole, wherein the through hole connects two opposite faces of a seat structure, wherein the shaft of the track lock is configured to fit within the through hole;
a locking cavity, wherein the locking cavity is cut through one or more faces of the seat structure other than the two opposite faces of the seat structure connected via the through hole;
one or more recesses, wherein the one or more recesses are on at least one of the one or more faces of the locking cavity, wherein a dimension of the one or more recesses is larger than a width of the locking cavity;
a locking member, wherein a first end of the locking member is configured to be secured by the one or more recesses and a second end of the locking member is configured to be secured by the locking hole, wherein the locking member and the locking hole mate via the locking cavity; and
a confinement member, wherein the confinement member is configured to be secured by the confinement hole via the through hole.

2. The track locking system of claim 1, wherein the track lock translates along the through hole to one of a raised position or a lowered position.

3. The track locking system of claim 2, wherein translation along the through hole is blocked by the locking member when the locking member is secured by one of the one or more recesses.

4. The track locking system of claim 1, wherein the confinement member prevents the track lock from falling out of the through hole when the locking member is removed.

5. The track locking system of claim 1, wherein the track locking system provides one or more visual indicators to show whether the seat is properly locked.

6. The track locking system of claim 5, wherein the one or more visual indicators comprises a position of the confinement member.

7. The track locking system of claim 6, wherein the one or more visual indicators comprises a position of the locking member.

8. The track locking system of claim 1, wherein one or more feet lobes are configured to prevent upward movement of the seat when the one or more seat track feet are in the metered position.

9. The track locking system of claim 1, wherein the track lock is configured to prevent upward movement of the seat when the one or more seat track feet are between the metered position.

10. A track lock comprising:
a base, wherein the base fits within a seat track and secures a seat to the seat track when one or more seat track feet are between a metered position;
a shaft, wherein the shaft is coupled to the base and is configured to fit within a through hole;
a locking hole, wherein a first end of a locking member is configured to be secured by one or more recesses and a second end of the locking member is configured to be secured by the locking hole, wherein the locking member and the locking hole mate via a locking cavity; and
a confinement hole, wherein a confinement member is configured to be secured by the confinement hole via the through hole, wherein the confinement member prevents the track lock from falling out of the through hole when the locking member is removed.

11. The track lock of claim 10, wherein the track lock translates along the through hole to one of a raised position or a lowered position.

12. The track lock of claim 11, wherein translation along the through hole is blocked by the locking member when the locking member is secured by one of the one or more recesses.

13. The track lock of claim 10, wherein the track lock provides one or more visual indicators to show whether the seat is properly locked.

14. The track lock of claim 13, wherein the one or more visual indicators comprises a position of the confinement member.

15. The track lock of claim 13, wherein the one or more visual indicators comprises a position of the locking member.

16. The track lock of claim 10, wherein one or more feet lobes are configured to prevent upward movement of the seat when the one or more seat track feet are in the metered position.

17. The track lock of claim 10, wherein the track lock is configured to prevent upward movement of the seat when the one or more seat track feet are between the metered position.

18. A method comprising:
positioning a seat structure of a seat above a seat track;
aligning one or more feet lobes of one or more seat track feet with one or more scallops of the seat track;
lowering the one or more feet lobes into the one or more scallops of the seat track;
positioning one or more track locking systems above the one or more scallops in the seat track, wherein a base of a track lock of each of the one or more track locking systems is located above the one or more scallops and the one or more feet lobes are located under one or more track tabs;
removing a locking member from a locking hole on the track lock, wherein the locking member was located at a first recess on the one or more track locking systems;
lowering the base of the track lock into the one or more scallops by sliding the track lock along a through hole;
inserting the locking member into the locking hole on the track lock, wherein the locking member is located at a second recess on the one or more track locking systems; and
sliding the seat to a position, wherein the one or more seat track feet are in a metered position.

19. The method of claim 18, wherein the one or more feet lobes are configured to prevent upward movement of the seat when the one or more seat track feet are in a metered position and the track lock is configured to prevent upward movement of the seat when the one or more seat track feet are between a metered position.

* * * * *